US012806535B2

(12) United States Patent
Wang et al.

(10) Patent No.: US 12,806,535 B2
(45) Date of Patent: Nov. 24, 2026

(54) METHOD AND APPARATUS FOR DISPLAYING HISTORICAL MESSAGES IN VIRTUAL BATTLES

(71) Applicant: Tencent Technology (Shenzhen) Company Limited, Shenzhen (CN)

(72) Inventors: Ziyi Wang, Shenzhen (CN); Chenghao Ye, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 155 days.

(21) Appl. No.: 18/891,607

(22) Filed: Sep. 20, 2024

(65) Prior Publication Data

US 2025/0010211 A1 Jan. 9, 2025

Related U.S. Application Data

(63) Continuation of application No. PCT/CN2023/128133, filed on Oct. 30, 2023.

(30) Foreign Application Priority Data

Dec. 22, 2022 (CN) ......................... 202211657872.6

(51) Int. Cl.
*A63F 13/87* (2014.01)
*A63F 13/52* (2014.01)

(52) U.S. Cl.
CPC .............. *A63F 13/87* (2014.09); *A63F 13/52* (2014.09)

(58) Field of Classification Search
CPC ....................................................... A63F 13/87
See application file for complete search history.

(56) References Cited

U.S. PATENT DOCUMENTS 9,591,083 B1 3/2017 Gumbula et al.
2003/0228909 A1* 12/2003 Tanaka .................... A63F 13/87 463/42

(Continued)

FOREIGN PATENT DOCUMENTS

CN 108540646 A 9/2018
CN 111865763 A 10/2020

(Continued)

OTHER PUBLICATIONS

Oct. 31, 2023—(PCT) International Search Report and Written Opinion—PCT/CN2023/128133.

(Continued)

*Primary Examiner* — Jay Huang
(74) *Attorney, Agent, or Firm* — Banner & Witcoff, Ltd.

(57) ABSTRACT

Aspects described herein disclose methods and systems for displaying historical messages in a virtual battle. The technique includes displaying a historical message dialog box for displaying a historical interactive message, and a first display attribute of the historical interactive message is related to a message transmission moment; displaying a first interactive message and message prompt information in the historical message dialog box, where the first interactive message is a historical interactive message received within a first duration, the message prompt information is configured for prompting existence of a second interactive message, and the second interactive message is a historical interactive message received outside the first duration; and displaying the second interactive message in the historical message dialog box when message viewing operation on the historical message dialog box meets a message display condition. The foregoing method enriches message display forms of the historical interactive message, and improves efficiency of viewing the historical interactive message.

20 Claims, 9 Drawing Sheets

(56) References Cited

U.S. PATENT DOCUMENTS

| | | | | |
|---|---|---|---|---|
| 2012/0122587 | A1* | 5/2012 | Kelly | A63F 13/87 463/25 |
| 2013/0007155 | A1* | 1/2013 | Moore | G06Q 10/101 709/206 |
| 2015/0350141 | A1* | 12/2015 | Yang | H04N 23/631 709/206 |
| 2017/0353416 | A1* | 12/2017 | Brooks | H04L 69/28 |
| 2018/0241871 | A1* | 8/2018 | Sarafa | H04L 51/212 |
| 2021/0031106 | A1* | 2/2021 | Alderman | A63F 13/35 |
| 2022/0150195 | A1* | 5/2022 | Chaudhri | G06F 3/04817 |
| 2022/0288491 | A1* | 9/2022 | Xiao | A63F 13/822 |
| 2023/0123698 | A1* | 4/2023 | Ahn | A63F 13/79 709/206 |

FOREIGN PATENT DOCUMENTS

| | | | |
|---|---|---|---|
| CN | 112295239 | A | 2/2021 |
| JP | 2017084280 | A | 5/2017 |
| JP | 6442390 | B2 | 12/2018 |
| WO | 2022012617 | A1 | 1/2022 |
| WO | 2022142641 | A1 | 7/2022 |
| WO | 2022252483 | A1 | 12/2022 |

OTHER PUBLICATIONS

Jun. 12, 2026—JP Notice of Reasons for Refusal—JP Application No. 2025-525581.

* cited by examiner

METHOD AND APPARATUS FOR DISPLAYING HISTORICAL MESSAGES IN VIRTUAL BATTLES

CROSS-REFERENCE TO RELATED APPLICATIONS

This application is a continuation application of PCT Application PCT/CN2023/128133, filed Oct. 31, 2023, which claims priority to Chinese Patent Application No. 202211657872.6, filed on Dec. 22, 2022, each entitled "METHOD AND APPARATUS FOR DISPLAYING HISTORY MESSAGE IN VIRTUAL BATTLE, DEVICE, AND STORAGE MEDIUM", and each which is incorporated herein by reference in its entirety.

FIELD

Aspects described herein relate to the field of human-computer interaction technologies, and in particular, to a method and apparatus for displaying a historical message in a virtual battle, a device, and a storage medium.

BACKGROUND

For a game in which a plurality of users need to collaborate in an online team to complete a specific task in the same virtual environment, users of the same camp may generally perform message interaction with each other through a message dialog box.

In the related art, each interactive message in the message dialog box is a message element with a player nickname and text content, and is directly arranged vertically in the message dialog box with the same display attribute.

As can be seen, in the related art, a display form of the interactive message in the message dialog box is single, which is inconvenient for a user to distinguish different interactive messages, and increases the difficulty for the user to obtain a valid interactive message.

SUMMARY

Aspects described herein provide a method and apparatus for displaying a historical message in a virtual battle, a device, and a storage medium, which can enrich message display forms of historical interactive messages, and improve efficiency of viewing the historical interactive message. The technical solutions are as follows:

An aspect described herein provides a method for displaying a historical message in a virtual battle, performed by a terminal device, the method including:

displaying a historical message dialog box, the historical message dialog box being configured for displaying a historical interactive message, the historical interactive message being a message transmitted by a virtual character in the virtual battle, and a first display attribute of the historical interactive message being related to a message transmission moment;

displaying a first interactive message and message prompt information in the historical message dialog box, the first interactive message being a historical interactive message received within a first duration, the message prompt information being configured for prompting existence of a second interactive message, and the second interactive message being a historical interactive message received outside the first duration; and displaying the second interactive message in the historical message dialog box when a message viewing operation on the historical message dialog box meets a message display condition, the message display condition being a preset condition configured for triggering display of the second interactive message.

Another aspect described herein provides an apparatus for displaying a historical message in a virtual battle, the apparatus including:

a first display module, configured to: display a historical message dialog box, the historical message dialog box being configured for displaying a historical interactive message, the historical interactive message being a message transmitted by a virtual character in the virtual battle, and a first display attribute of the historical interactive message being related to a message transmission moment; and display a first interactive message and message prompt information in the historical message dialog box, the first interactive message being a historical interactive message received within a first duration, the message prompt information being configured for prompting existence of a second interactive message, and the second interactive message being a historical interactive message received outside the first duration; and a second display module, configured to display the second interactive message in the historical message dialog box when a message viewing operation on the historical message dialog box meets a message display condition, the message display condition being a preset condition configured for triggering display of the second interactive message.

According to another aspect, there is a terminal device, including a processor and a memory, the memory having a computer program stored therein, and the computer program being loaded and executed by the processor to implement the method for displaying a historical message in a virtual battle according to the foregoing aspects.

According to another aspect, there is a computer-readable storage medium, having a computer program stored therein, the computer program being loaded and executed by a processor to implement the method for displaying a historical message in a virtual battle according to the foregoing aspects.

According to another aspect, there is a computer program product, including a computer program, the computer program being stored in a computer-readable storage medium. A processor of a terminal device reads the computer program from the computer-readable storage medium, and the processor executes the computer program, to cause the terminal device to perform the method for displaying a historical message in a virtual battle according to the foregoing aspects.

In the aspects described herein, a historical interactive message transmitted by a virtual character in a virtual battle is displayed through a historical message dialog box, where a first display attribute of the historical interactive message is related to a message transmission moment. A first interactive message and message prompt information are displayed in the historical message dialog box. A message viewing operation on the historical message dialog box is received, and when the message viewing operation meets a message display condition, a second interactive message is displayed in the historical message dialog box. By using the solution provided in the aspects described herein, the first display attribute of the historical interactive message is determined according to the message transmission moment, which enriches message display forms of the historical interactive message, and the historical interactive message is divided into the first interactive message and the second interactive message according to a first duration, so that efficiency of viewing the historical interactive message is improved. In other words, a historical interactive message (the second interactive message) received outside the first duration is hidden, and the second interactive message is displayed only when the message interactive operation meets the condition, to reduce impact of excessive irrelevant messages or an unimportant message on a battle at a current moment.

DETAILED DESCRIPTION

In order to make the objectives, technical solutions, and advantages described herein clearer, the following describes implementations described herein in further detail with reference to the accompanying drawings.

Figure 1:
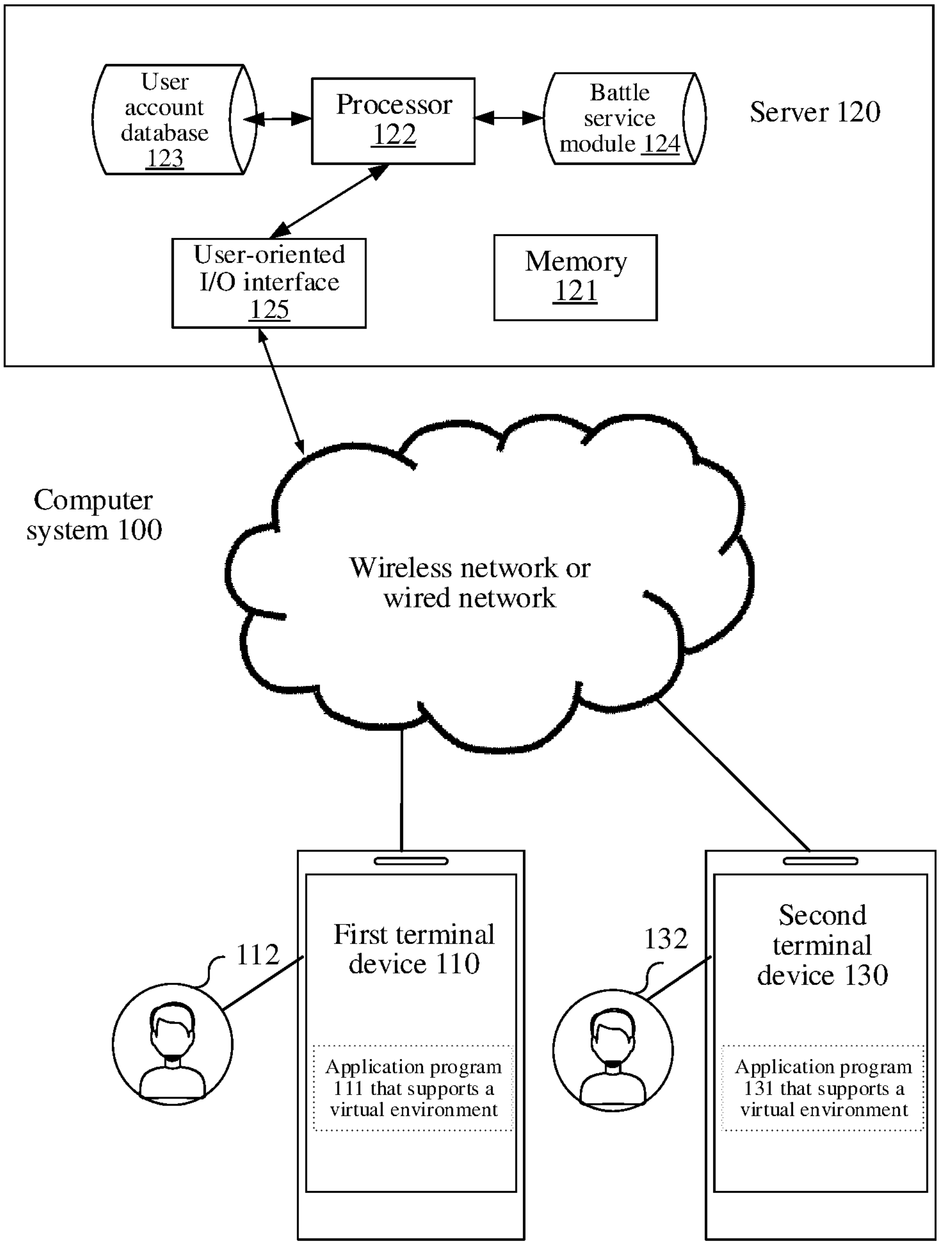
FIG. 1 is a schematic diagram of an implementation environment according to an aspect described herein.

FIG. 1 is a schematic diagram of an implementation environment according to an aspect described herein. The implementation environment may include: a first terminal device 110, a server 120, and a second terminal device 130.

An application program 111 that supports a virtual environment is run in the first terminal device 110, where the application program 111 may be a multiplayer online battle program. When the first terminal device runs the application program 111, a user interface of the application program 111 is displayed on a screen of the first terminal device 110. The application program 111 may be any one of a multiplayer online battle arena (MOBA) game or a simulation game (SLG). In this aspect, an example in which the application program 111 is a first-person shooting (FPS) game is used for description. The first terminal device 110 is a terminal device used by a first user 112. The first user 112 uses the first terminal device 110 to control a first virtual object in the virtual environment to perform activities, and the first virtual object may be referred to as a main controlled virtual object of the first user 112. The activities of the first virtual object include but are not limited to at least one of adjusting a body posture, crawling, walking, running, riding, flying, jumping, driving, picking, shooting, attacking, throwing, or casting an ability. For example, the first virtual object is a first virtual character, such as a simulated character or a cartoon character.

An application program 131 that supports a virtual environment is run in the second terminal device 130, where the application program 131 may be a multiplayer online battle program. When the second terminal device 130 runs the application program 131, a user interface of the application program 131 is displayed on a screen of the second terminal device 130. The application program may be any one of a MOBA game or an SLG game. In this aspect, an example in which the application program 131 is an FPS game is used for description. The second terminal device 130 is a terminal device used by a second user 132, the second user 132 uses the second terminal device 130 to control a second virtual object in the virtual environment to perform activities, and the second virtual object may be referred to as a main controlled virtual character of the second user 132. For example, the second virtual object is a second virtual character, such as a simulated character or a cartoon character.

In some aspects, the first virtual object and the second virtual object are in the same virtual world. In some aspects, the first virtual object and the second virtual object may belong to the same camp, the same team, or the same organization, or have a friend relationship, or have a temporary communication permission. In some aspects, the first virtual object and the second virtual object may belong to different camps, different teams, or different organizations, or have a hostile relationship with each other.

In some aspects, application programs installed on the first terminal device 110 and the second terminal device 130 are the same, or application programs installed on the two terminal devices are application programs of the same type on different operating system platforms (Android or IOS). The first terminal device 110 may refer to one of a plurality of terminal devices, and the second terminal device 130 may refer to another one of the plurality of terminal devices. In this aspect, the first terminal device 110 and the second terminal device 130 are merely used as an example for description. Device types of the first terminal device 110 and the second terminal device 130 are the same or different. Each device type includes at least one of a smartphone, a tablet computer, an e-book reader, a Moving Picture Experts Group Audio Layer III (MP3) player, a Moving Picture Experts Group Audio Layer IV (MP4) player, a laptop computer, or a desktop computer.

Only two terminal devices are shown in FIG. 1. However, in different aspects, a plurality of other terminal devices may access the server 120. In some aspects, one or more terminal devices are terminal devices corresponding to a developer. By installing a development and editing platform for the application program that supports a virtual environment in the terminal device, the developer may edit and update the application program on the terminal device, and transmit an updated application program installation package to the server 120 through a wired or wireless network. The first terminal device 110 and the second terminal device 130 may download the application program installation package from the server 120 to update the application program.

The first terminal device 110, the second terminal device 130, and another terminal device are connected to the server 120 through a wired network or a wireless network.

The server 120 includes at least one of a server, a server cluster including a plurality of servers, a cloud computing platform, or a virtualization center. The server 120 is configured to provide a background service for an application program that supports a three-dimensional virtual environment. In some aspects, the server 120 takes on primary computing work, and the terminal device takes on secondary computing work; or the server 120 takes on secondary computing work, and the terminal device takes on primary computing work; or collaborative computing is performed by using a distributed computing architecture between the server 120 and the terminal device.

For example, the server 120 includes a memory 121, a processor 122, a user account database 123, a battle service module 124, and a user-oriented input/output interface (I/O interface) 125. The processor 122 is configured to load instructions stored in the server 120 and process data in the user account database 123 and the battle service module 124. The user account database 123 is configured to store data of user accounts used by the first terminal device 110, the second terminal device 130, and the another terminal device, such as avatars of the user accounts, nicknames of the user accounts, combat power indices of the user accounts, and service areas where the user accounts are located. The battle service module 124 is configured to provide a plurality of battle rooms for users to battle, such as a 1V1 battle, a 3V3 battle, or a 5V5 battle. The user-oriented I/O interface 125 is configured to establish communication with the first terminal device 110 and/or the second terminal device 130 through the wireless network or the wired network to exchange data.

Figure 2:
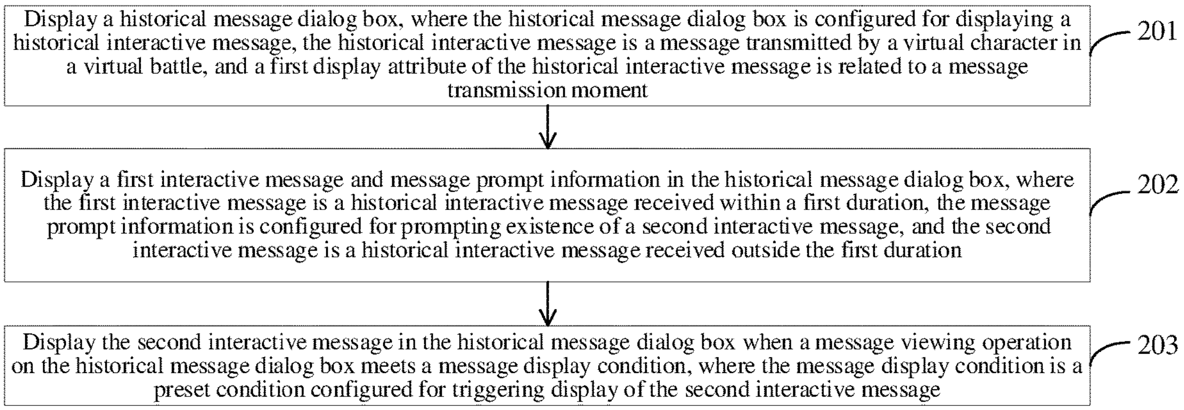
FIG. 2 is a flowchart of a method for displaying a historical message in a virtual battle according to an illustrative aspect described herein.

FIG. 2 is a flowchart of a method for displaying a historical message in a virtual battle according to an illustrative aspect described herein. In this aspect, an example in which the method is applied to the first terminal device 110 or the second terminal device 130 in the implementation environment or the another terminal device in the implementation environment shown in FIG. 1 is used for description. Operations of the method may be executed by the foregoing terminal device, or may be executed by a client of an application program running on the foregoing terminal device. The method includes the following operations:

Operation 201: Display a historical message dialog box, where the historical message dialog box is configured for displaying a historical interactive message, the historical interactive message is a message transmitted by a virtual character in the virtual battle, and a first display attribute of the historical interactive message is related to a message transmission moment.

In some aspects, during the battle, in response to a trigger operation on a historical message viewing control by a user, the terminal device displays the historical message dialog box, where historical interactive messages transmitted between virtual characters during the virtual battle are displayed in the historical message dialog box.

A user interface (UI) control is any visual control or element that can be seen on a user interface of an application program, for example, a control such as a picture, an input box, a text box, a button, or a label, where some UI controls respond to an operation of the user, for example, the historical message viewing control. The user triggers the historical message viewing control, and the historical message dialog box is displayed. The UI control involved in the aspects described herein includes but is not limited to: the historical message viewing control and an evolution control.

In some aspects, the trigger operation is an operation for triggering display of the historical message dialog box on the historical message viewing control. An operation type of the trigger operation is not limited in this application. The operation type of the trigger operation includes but is not limited to a tap operation, a long-press operation, a swipe operation, and the like. For operation types of other operations below, reference is made to the trigger operation herein. Details are not described herein again.

In some aspects, the historical message dialog box may display historical interactive messages between all virtual characters in the virtual battle, or may display historical interactive messages between virtual characters in the same camp in the virtual battle, or may display historical interactive messages between virtual characters in a plurality of camps in the virtual battle. This is not specifically limited in the aspects described herein.

In some aspects, for ease of viewing the historical interactive message in the historical message dialog box, the terminal device determines a first display attribute of the historical interactive message according to a message transmission moment corresponding to the historical interactive message, where first display attributes corresponding to different message transmission moments are different.

In some aspects, for case of distinguishing historical interactive messages transmitted by different virtual characters, the terminal device may further determine the first display attribute according to the virtual character corresponding to the historical interactive message, where first display attributes corresponding to different virtual characters are different.

In some aspects, the first display attribute may include message display transparency, a message display interval, a message display position, and the like. This is not specifically limited in the aspects described herein.

Figure 3:
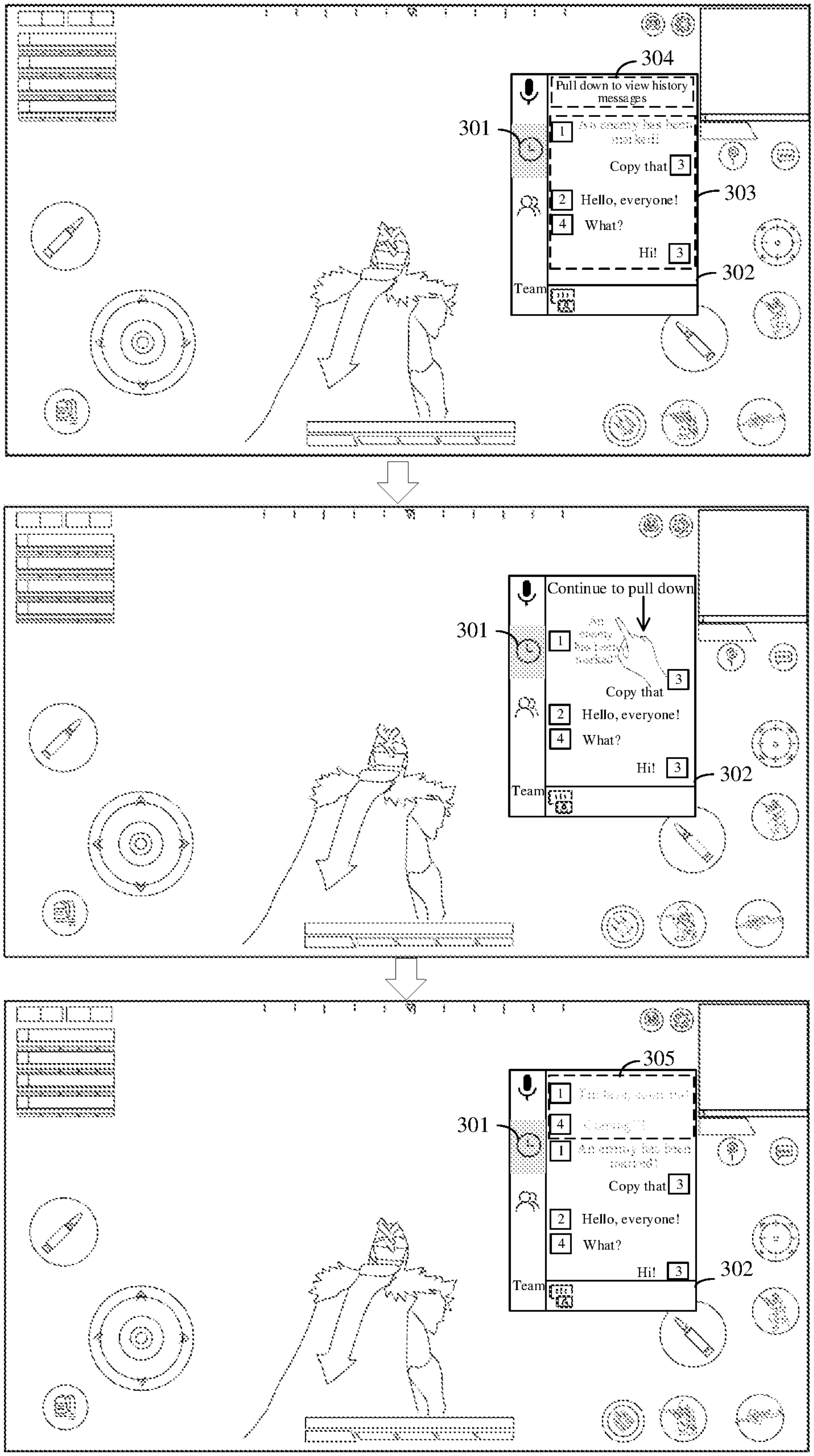
FIG. 3 is a schematic display diagram of historical messages in a virtual battle according to an illustrative aspect described herein.

For example, as shown in FIG. 3, when receiving a tap operation on a historical message viewing control 301, the terminal device displays a historical message dialog box 302.

Operation 202: Display a first interactive message and message prompt information in the historical message dialog box, where the first interactive message is a historical interactive message received within a first duration, the message prompt information is configured for prompting existence of a second interactive message, and the second interactive message is a historical interactive message received outside the first duration.

In some aspects, the first interactive message is a historical interactive message received within the first duration, and the second interactive message is a historical interactive message received outside the first duration. For example, the first interactive message is a historical interactive message received within a time interval less than or equal to the first duration from a current moment. For example, taking the current moment as a reference, a historical interactive message received within a time period of the first duration prior to the current moment is considered as the first interactive message. For example, the second interactive message is a historical interactive message received at a moment whose time interval with the current moment is greater than the first duration. For example, taking the current moment as a reference, a historical interactive message received in a time period greater than the first duration prior to the current moment is considered as the second interactive message. That is, the first interactive message is a message received within the latest period of time, and the second interactive message is a message received at a moment relatively far from the current moment.

In some aspects, the historical interactive message refers to a message that is received or transmitted by the terminal device before the current moment and that interacts with another terminal device. A specific type of the historical interactive message is not limited in the aspects described herein. The type of the historical interactive message includes but is not limited to a text message, a voice message, a video message, and an action message.

In some aspects, in a process in which virtual characters interact with each other by transmitting a message, the message in the virtual battle has specific timeliness. For example, when a first virtual character transmits a supply mark message, after a supply indicated by the supply mark message is obtained, the supply mark message is an invalid message or is no longer relevant. Therefore, to improve the display validity of the historical interactive message in the historical message dialog box, the terminal device determines a historical interactive message within the first duration from the current moment as the first interactive message, and determines a historical interactive message outside the first duration from the current moment as the second interactive message based on the first duration.

In some aspects, the first duration may be preset by the terminal device, or may be set by the user during the virtual battle. This is not limited in the aspects described herein.

In some aspects, after receiving the trigger operation of the user on the historical message viewing control, the terminal device displays the historical message dialog box, displays the first interactive message in the historical message dialog box, and folds and hides the second interactive message. In addition, the terminal device sets the message prompt information to prompt the user of existence of the second interactive message received outside the first duration.

In some aspects, when receiving the trigger operation of the user on the historical message dialog box, the terminal device switches to display the first interactive message. When the first interactive message is displayed, the terminal device displays the message prompt information, and receives a message viewing operation of the user in the historical message dialog box.

In some aspects, the message viewing operation is an operation for viewing the second interactive message. For example, in response to the message viewing operation, the second interactive message is displayed. An operation type of the trigger operation is not limited in this application. The operation type of the trigger operation includes but is not limited to a tap operation, a long-press operation, a swipe operation, and the like.

In some aspects, the user may switch to display the first interactive message in the historical message dialog box through a swipe operation, or may switch to display the first interactive message in the historical message dialog box through a page switch operation. This is not limited in the aspects described herein.

In some aspects, when the first interactive message and the message prompt information are displayed in the historical message dialog box, the terminal device receives a message viewing operation of the user in the historical message dialog box. In some aspects, the message viewing operation may be a pull-down operation or a long-press operation. This is not limited in the aspects described herein.

For example, as shown in FIG. 3, when a first interactive message 303 and message prompt information 304 are displayed in the historical message dialog box 302, the terminal device receives a pull-down operation in the historical message dialog box 302.

Operation 203: Display the second interactive message in the historical message dialog box when the message viewing operation on the historical message dialog box meets a message display condition, where the message display condition is a preset condition configured for triggering display of the second interactive message.

In some aspects, when receiving the message viewing operation, the terminal device performs condition judgment on an operation progress of the message viewing operation. When the message viewing operation meets the message display condition, the terminal device displays the second interactive message in the historical message dialog box and hides the message prompt information.

In some aspects, the message display condition is a preset condition configured for triggering the display of the second interactive message. For example, the message display condition includes but is not limited to an operation duration of the message viewing operation meeting a threshold, a pressing position of the message viewing operation meeting a specific position, and an operation direction of the message viewing operation meeting a specific direction. In some aspects, when the message viewing operation is a pull-down operation, the message display condition may be a pull-down distance of the pull-down operation; and when the message viewing operation is a long-press operation, the message display condition may be a long-press duration of the long-press operation. A specific operation form of the message viewing operation is not limited in the aspects described herein.

For example, as shown in FIG. 3, when the pull-down distance of the pull-down operation meets the condition, the terminal device displays a second interactive message 305 in the historical message dialog box 302.

In summary, in the aspects described herein, a historical interactive message transmitted by a virtual character in a virtual battle is displayed through a historical message dialog box, where a first display attribute of the historical interactive message is related to a message transmission moment. A first interactive message and message prompt information are displayed in the historical message dialog box. In response to a message viewing operation on the historical message dialog box, when the message viewing operation meets a message display condition, a second interactive message is displayed in the historical message dialog box. By using the solution provided in the aspects described herein, the first display attribute of the historical interactive message is determined according to the message transmission moment, which enriches message display forms of the historical interactive message, and the historical interactive message is divided into the first interactive message and the second interactive message according to a first duration, so that efficiency of viewing the historical interactive message is improved. In other words, a historical interactive message (the second interactive message) received outside the first duration is hidden, and the second interactive message is displayed only when the message interactive operation meets the condition, to reduce impact of excessive irrelevant messages or an unimportant message on a battle at a current moment.

In some aspects, for case of distinguishing historical interactive messages transmitted between virtual characters at different moments, the terminal device may determine a display attribute of each historical interactive message according to a message transmission moment of the historical interactive message, and display the historical interactive message based on the display attribute, thereby improving efficiency of a user in viewing the historical interactive message.

Figure 4:
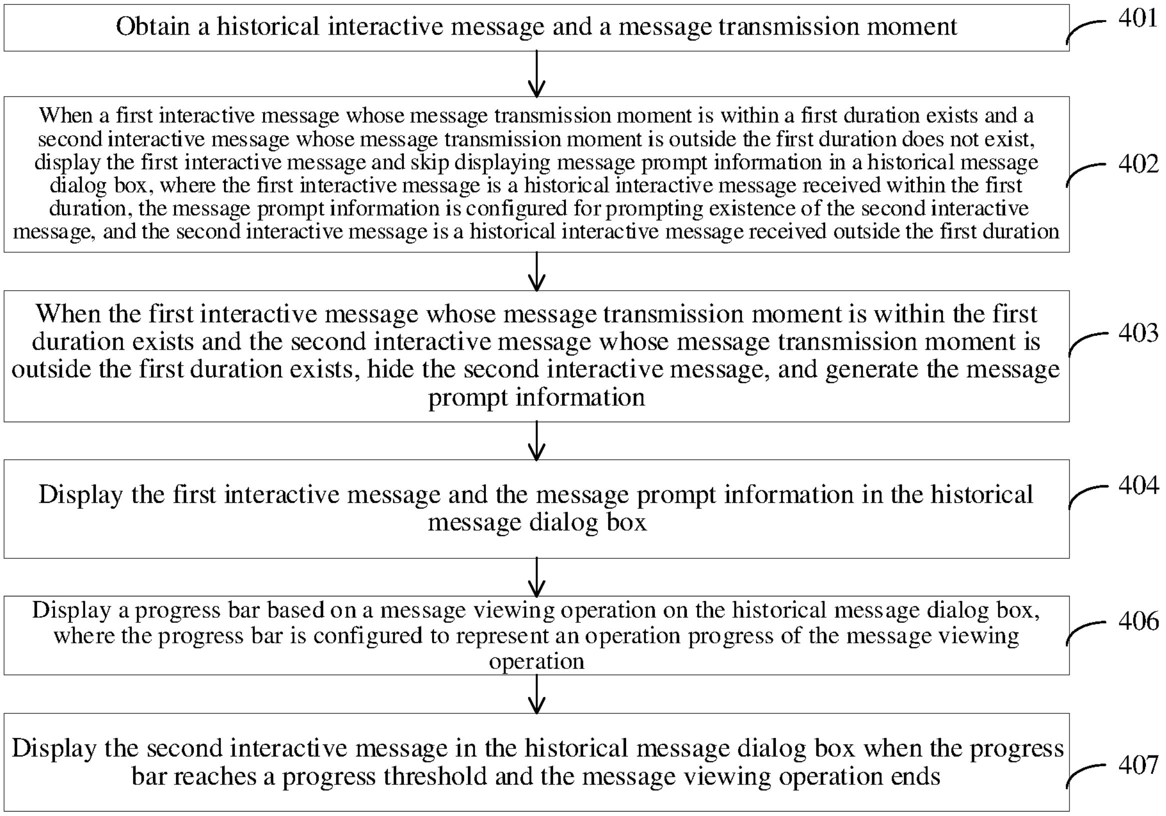
FIG. 4 is a flowchart of a method for displaying a historical message in a virtual battle according to another illustrative aspect described herein.

FIG. 4 is a flowchart of a method for displaying a historical message in a virtual battle according to an illustrative aspect described herein. In this aspect, an example in which the method is applied to the first terminal device 110 or the second terminal device 130 in the implementation environment or the another terminal device in the implementation environment shown in FIG. 1 is used for description. Operations of the method may be executed by the foregoing terminal device, or may be executed by a client of an application program running on the foregoing terminal device. The method includes the following operations:

Operation 401: Obtain a historical interactive message and a message transmission moment.

In some aspects, the terminal device obtains historical interactive messages transmitted between virtual characters in a current virtual battle, and a message transmission moment corresponding to each historical interactive message.

In some aspects, to distinguish a transmitter corresponding to each historical interactive message, the terminal device may also obtain a virtual character nickname corresponding to the message transmitter at the same time.

Operation 402: When a first interactive message whose message transmission moment is within a first duration exists and a second interactive message whose message transmission moment is outside the first duration does not exist, display the first interactive message and skip displaying message prompt information in a historical message dialog box, where the first interactive message is a historical interactive message received within the first duration, the message prompt information is configured for prompting existence of the second interactive message, and the second interactive message is a historical interactive message received outside the first duration.

In some aspects, the terminal device or the server divides the historical interactive messages into the first interactive message and the second interactive message based on the message transmission moment and the first duration, where the message transmission moment corresponding to the first interactive message is within the first duration, and the message transmission moment corresponding to the second interactive message is outside the first duration.

In some aspects, the first duration may be preset by the terminal device or the server, or may be set by the user during the virtual battle. This is not limited in the aspects described herein.

In some aspects, considering that in different battle modes, durations of virtual battles are generally different. To improve display validity of the first interactive message, the terminal device or the server may determine the first duration based on a battle mode of a virtual battle, where first durations corresponding to different battle modes are different, and the first duration is related to an average duration of a battle in the battle mode. In some aspects, after the server determines the first duration, the server transmits the first duration to the terminal device.

In some aspects, the average duration of the battle may be determined by the terminal device based on a history duration record of the battle, or may be preset by a developer in battle data. This is not limited in the aspects described herein.

For example, the first duration is 5 minutes. The terminal device or the server determines, according to the message transmission moment of each historical interactive message, a historical interactive message within 5 minutes from a current moment as the first interactive message, and a historical interactive message outside 5 minutes from the current moment as the second interactive message.

In some aspects, when the first interactive message exists and the second interactive message does not exist, the terminal device displays the first interactive message in the historical message dialog box.

In some aspects, to distinguish first interactive messages transmitted at different moments, the terminal device or the server determines display transparency of the first interactive message based on the message transmission moment of the first interactive message. The terminal device determines first display transparency corresponding to the first interactive message according to a time interval between the message transmission moment and the current moment, where the first display transparency is positively correlated with the time interval. Therefore, the terminal device displays the first interactive message in the historical message dialog box based on the first display transparency.

For example, the terminal device or the server divides the time interval between the message transmission moment and the current moment according to the first duration. When the first duration is 5 minutes, the terminal device determines first display transparency corresponding to a first interactive message within an time interval of 1 minute as 0%, determines first display transparency corresponding to a first interactive message within an time interval of 1 minute to 2 minutes as 15%, determines first display transparency corresponding to a first interactive message within an time interval of 2 minutes to 3 minutes as 30%, determines first display transparency corresponding to a first interactive message within an time interval of 3 minutes to 4 minutes as 45%, and determines first display transparency corresponding to a first interactive message within an time interval of 4 minutes to 5 minutes as 60%. Certainly, the display transparency of different interactive messages may alternatively be determined by a backend server of the terminal device. This is not limited in this application.

Figure 5:
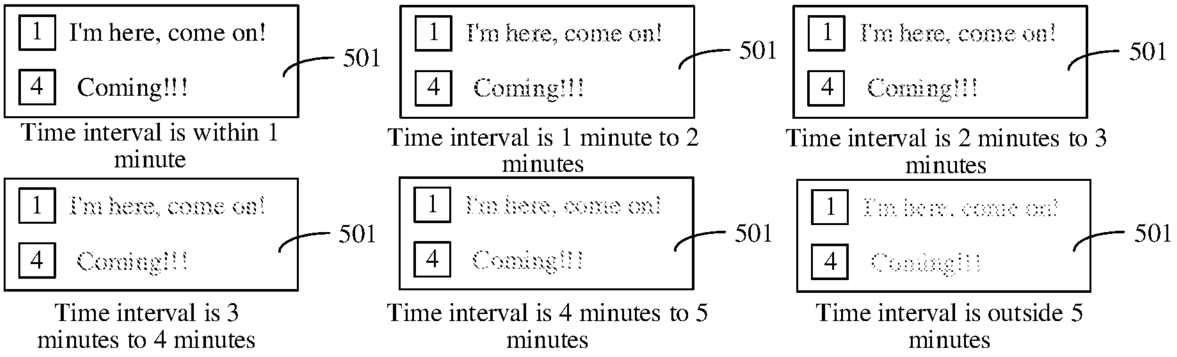
FIG. 5 is a schematic display diagram of different message display transparency according to an illustrative aspect described herein.

For example, as shown in FIG. 5, when a time interval between a message transmission moment of a first interactive message 501 and the current moment is within 1 minute, display transparency of the first interactive message 501 is 0%; when the time interval between the message transmission moment of the first interactive message 501 and the current moment is 1 minute to 2 minutes, the display transparency of the first interactive message 501 is 15%; when the time interval between the message transmission moment of the first interactive message 501 and the current moment is 2 minutes to 3 minutes, the display transparency of the first interactive message 501 is 30%; when the time interval between the message transmission moment of the first interactive message 501 and the current moment is 3 minutes to 4 minutes, the display transparency of the first interactive message 501 is 45%; when the time interval between the message transmission moment of the first interactive message 501 and the current moment is 4 minutes to 5 minutes, the display transparency of the first interactive message 501 is 60%; and when the time interval between the message transmission moment of the first interactive message 501 and the current moment is more than 5 minutes, the display transparency of the first interactive message 501 is 75%.

In some aspects, to facilitate the user to find a useful interactive message from the first interactive message, the terminal device or the server may further determine a display interval of first interactive messages based on the message transmission moment of the first interactive message, where the display interval refers to a display distance between two adjacent first interactive messages. The terminal device or the server determines a transmission time interval between two adjacent first interactive messages according to the message transmission moment corresponding to each first interactive message, and determines the display interval corresponding to the first interactive message according to the transmission time interval, where the display interval is positively correlated with the transmission time interval. Therefore, the terminal device displays the first interactive message in the historical message dialog box based on the display interval.

In some aspects, the terminal device may represent the display interval between first interactive messages through a quantity of pixels in a display picture. In some aspects, to avoid that the display interval between first interactive messages is excessively large, the terminal device may set a maximum time interval and a maximum display interval. In other words, when the transmission time interval is greater than the maximum time interval, the display interval may be directly equal to the maximum display interval.

For example, the terminal device or the server divides the display interval according to the transmission time interval between first interactive messages, and sets the maximum time interval to 5 minutes and the maximum display interval to 55 pixels. When the transmission time interval between two adjacent first interactive messages is within 1 minute, the display interval is determined as 5 pixels; when the transmission time interval is 1 minute to 2 minutes, the display interval is determined as 15 pixels; when the transmission time interval is 2 minutes to 3 minutes, the display interval is determined as 25 pixels; when the transmission time interval is 3 minutes to 4 minutes, the display interval is determined as 35 pixels; when the transmission time interval is 4 minutes to 5 minutes, the display interval is determined as 45 pixels; and when the transmission time interval is greater than 5 minutes, the display interval is determined as 55 pixels.

Figure 6:
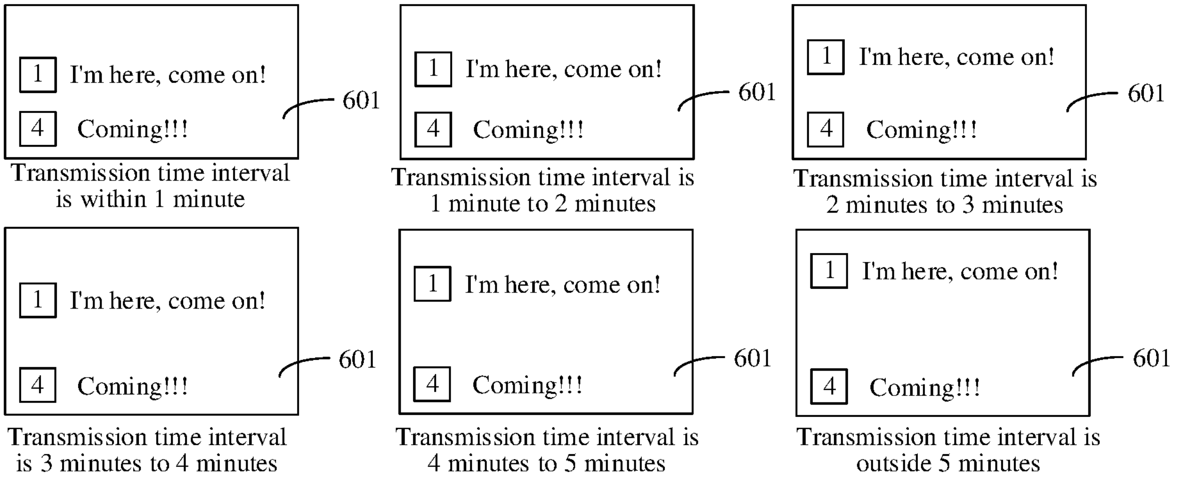
FIG. 6 is a schematic display diagram of different message display intervals according to an illustrative aspect described herein.

For example, as shown in FIG. 6, when a transmission time interval between two adjacent first interactive messages 601 is within 1 minute, a display interval between the two adjacent first interactive messages 601 is 5 pixels; when the transmission time interval between the two adjacent first interactive messages 601 is 1 minute to 2 minutes, the display interval between the two adjacent first interactive messages 601 is 15 pixels; when the transmission time interval between the two adjacent first interactive messages 601 is 2 minutes to 3 minutes, the display interval between the two adjacent first interactive messages 601 is 25 pixels; when the transmission time interval between the two adjacent first interactive messages 601 is 3 minutes to 4 minutes, the display interval between the two adjacent first interactive messages 601 is 35 pixels; when the transmission time interval between the two adjacent first interactive messages 601 is 4 minutes to 5 minutes, the display interval between the two adjacent first interactive messages 601 is 45 pixels; and when the transmission time interval between the two adjacent first interactive messages 601 is more than 5 minutes, the display interval between the two adjacent first interactive messages 601 is 55 pixels.

In some aspects, to distinguish a message transmitter corresponding to each first interactive message, the terminal device or the server may further determine a display position of the first interactive message in the historical message dialog box according to different message transmitters. First of all, the terminal device obtains message transmitters corresponding to first interactive messages, and based on the message transmitters, displays a first interactive message transmitted by a local virtual character on a first side of the historical message dialog box, and displays a first interactive message transmitted by a non-local virtual character on a second side of the historical message dialog box. In some aspects, the second side is another side different from the first side.

For example, the terminal device may display the first interactive message transmitted by the local virtual character on a right side of the historical message dialog box, and display the first interactive message transmitted by the non-local virtual character on a left side of the historical message dialog box.

Figure 7:
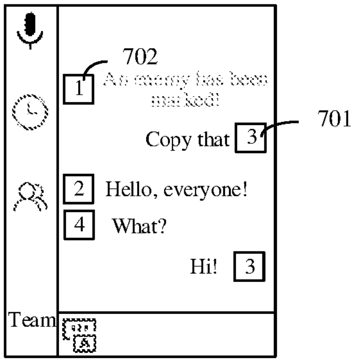
FIG. 7 is a schematic display diagram of different message display positions according to an illustrative aspect described herein.

For example, as shown in FIG. 7, the terminal device displays a first interactive message transmitted by a local virtual character 701 on the right side of the historical message dialog box, and displays a first interactive message transmitted by a non-local virtual character 702 on the left side of the historical message dialog box.

In some aspects, to improve efficiency of controlling the virtual character based on the first interactive message, in addition to the first display attribute of the first interactive message, the terminal device may further determine a second display attribute of the first interactive message according to a message type of the first interactive message. In some aspects, the second display attribute may include a message display font, a message display color, a message display dynamic effect, and the like. This is not limited in the aspects described herein.

In some aspects, the terminal device first determines the message type of the first interactive message based on the first interactive message, where the message type may include a location mark type, an item mark type, a supply exchange type, a skill help type, and the like. This is not limited in the aspects described herein. Further, the terminal device determines the second display attribute of the first interactive message based on the message type, so as to display the first interactive message in the historical message dialog box based on the second display attribute. Second display attributes corresponding to first interactive messages of different message types are different. For example, message display colors corresponding to the first interactive messages of different message types are different.

In some aspects, considering that transmission of the interactive messages between virtual characters in the virtual battle is to improve operation interaction between the virtual characters in the virtual battle, after the first interactive message is responded to, the first interactive message changes from useful information to useless or less relevant information. Therefore, to improve efficiency of the user in extracting useful information from the first interactive message, the terminal device may further determine a third display attribute according to a message response status of the first interactive message, and display the first interactive message in the historical message dialog box based on the third display attribute. For example, when the first interactive message is responded to, the terminal device may determine the third display attribute as a minimum display font size.

In some aspects, for first interactive messages having different message intentions, the terminal device has different manners in determining message response statuses.

In some aspects, when the first interactive message is a location mark message, the terminal device may determine the message response status based on a position of a virtual character in the same camp within a second duration after the location mark message is transmitted, and when the virtual character in the same camp passes by a virtual location indicated by the location mark message within the second duration, the terminal device determines that the location mark message is responded to or no longer relevant.

In some aspects, when the first interactive message is an item mark message, the terminal device may determine the message response status based on a pickup status of an item indicated by the item mark message, and when the item indicated by the item mark message is picked up, the terminal device determines that the item mark message is responded to.

In some aspects, when the first interactive message is a supply exchange message, the terminal device may determine the message response status based on an exchange status of a supply indicated by the supply exchange message, and when the supply indicated by the supply exchange message is exchanged between virtual characters, the terminal device determines that the supply exchange message is responded to.

Operation 403: When the first interactive message whose message transmission moment is within the first duration exists and the second interactive message whose message transmission moment is outside the first duration exists, hide the second interactive message, and generate the message prompt information.

In some aspects, considering that the virtual characters in the virtual battle transmit interactive messages to each other, operation control may be implemented in time according to the interactive messages. Therefore, each interactive message in the virtual battle often has specific timeliness. For the second interactive message whose message transmission moment is outside the first duration, when the historical interactive message is viewed through the historical message dialog box, the second interactive message usually cannot have a large effect on the virtual battle due to an excessively long time interval between the message transmission moment of the second interactive message and the current moment.

In some aspects, to avoid failure of quickly viewing useful information from the historical interactive messages since excessive historical interactive messages are displayed in the historical message dialog box, when the first interactive message whose message transmission moment is within the first duration exists and the second interactive message whose message transmission moment is outside the first duration exists, the terminal device may display the first interactive message in the historical message dialog box, hide the second interactive message, and generate the message prompt information to prompt existence of the second interactive message.

Operation 404: Display the first interactive message and the message prompt information in the historical message dialog box.

In some aspects, when the first interactive message is displayed in the historical message dialog box, the terminal device receives a swipe-up operation by the user in the historical message dialog box, and switches to display the first interactive message in the historical message dialog box based on the swipe-up operation. When first interactive messages are all displayed, the terminal device displays the message prompt information after a last first interactive message in the historical message dialog box, so that the message prompt information is within a visual range of the historical message dialog box.

Figure 8:
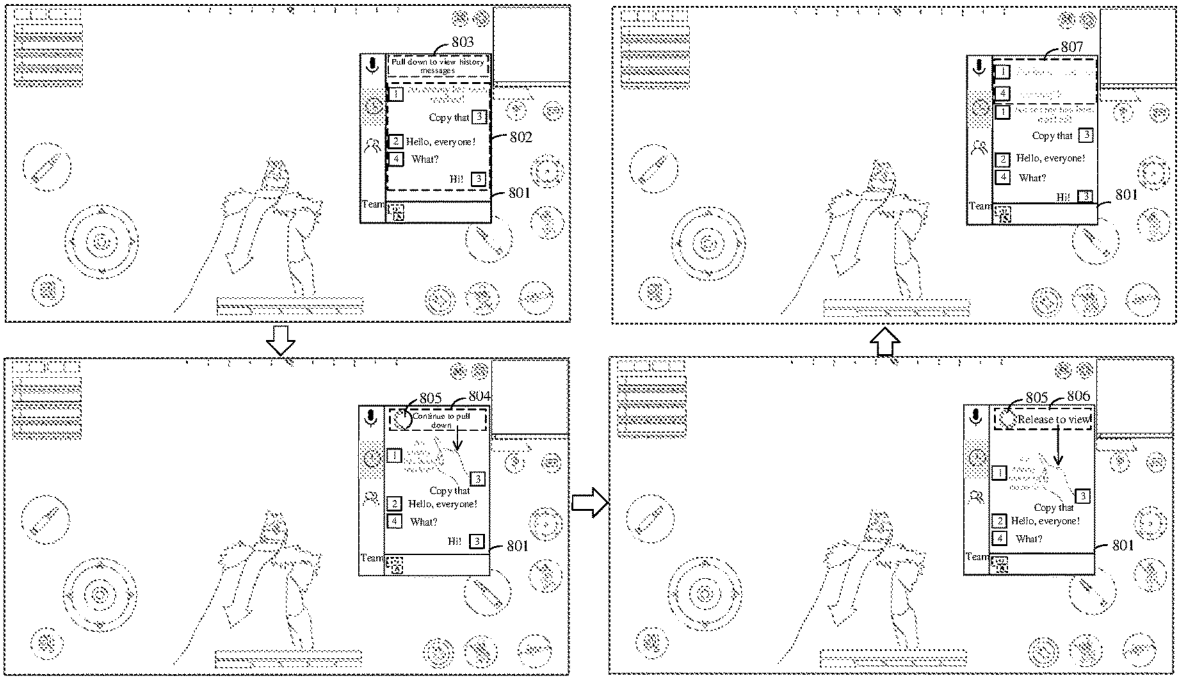
FIG. 8 is a schematic display diagram of historical messages in a virtual battle according to another illustrative aspect described herein.

For example, as shown in FIG. 8, when message prompt information 803 is located within a visual range of a historical message dialog box 801, the terminal device displays a first interactive message 802 and the message prompt information 803 in the historical message dialog box 801.

Operation 406: Display a progress bar based on a message viewing operation on the historical message dialog box, where the progress bar is configured for representing an operation progress of the message viewing operation.

In some aspects, when the message viewing operation on the historical message dialog box is received, the terminal device displays the progress bar based on the message viewing operation, where the progress bar is configured for representing the operation progress of the message viewing operation.

In some aspects, the message viewing operation is a pull-down operation. when the pull-down operation in the historical message dialog box is received, the terminal device displays a progress bar in the historical message dialog box, to represent an operation progress of the pull-down operation through the progress bar.

A pull-down distance of the pull-down operation is positively correlated with a display progress in the progress bar. For example, when the progress bar is a circular progress bar, the terminal device may divide the progress bar into 360 equal parts, where each part is 1°, and set a maximum pull-down distance to 50 pixels. Therefore, every time the pull-down operation slides down by 1 pixel, the progress of the circular progress bar advances by 7.2°. When the pull-down operation reaches 50 pixels, the display progress of the circular progress bar reaches a progress threshold.

In some aspects, during the pull-down operation, the terminal device displays a first operation prompt in the historical message dialog box, where the first operation prompt is configured for prompting the user to continue the pull-down operation to reach an operation condition. Further, when the pull-down operation reaches a pull-down threshold, the terminal device displays a second operation prompt in the historical message dialog box, where the second operation prompt is configured for prompting the user that the pull-down operation meets the operation condition.

For example, as shown in FIG. 8, the terminal device receives a pull-down operation in the historical message dialog box 801. During the pull-down operation, the terminal device displays a first operation prompt 804 and a progress bar 805 in the historical message dialog box 801, where a display progress of the progress bar 805 is positively correlated with a pull-down distance of the pull-down operation. When the pull-down distance of the pull-down operation reaches the pull-down threshold, the terminal device displays a second operation prompt 806.

In some aspects, the message viewing operation may alternatively be a long-press operation. When the long-press operation in the historical message dialog box is received, the terminal device displays a progress bar in the historical message dialog box, where a long-press duration of the long-press operation is positively correlated with a display progress of the progress bar.

Operation 407: Display the second interactive message in the historical message dialog box when the progress bar reaches a progress threshold and the message viewing operation ends.

Further, when the progress bar reaches the progress threshold and the message viewing operation ends, the terminal device displays the second interactive message after the first interactive message in the historical message dialog box.

For example, as shown in FIG. 8, when the progress bar 805 reaches a progress threshold and the pull-down operation ends, the terminal device displays a second interactive message 807 in the historical message dialog box 801.

In some aspects, considering that the second interactive message is a historical interactive message outside the first duration, to facilitate the user to distinguish the first interactive message from the second interactive message based on the first display attribute of the first interactive message, the terminal device may display the second interactive message with second display transparency in the historical message dialog box, where the second display transparency is minimum display transparency for displaying the historical interactive message.

For example, when the first duration is 5 minutes, the second interactive message is a historical interactive message outside 5 minutes, and the terminal device may set the second display transparency of the second interactive message to 75%.

In some aspects, based on the message transmission moment of the second interactive message, the terminal device or the server may determine, based on a transmission time interval between two adjacent second interactive messages, a message display interval between the two adjacent second interactive messages. Alternatively, different from the first interactive message, the terminal device or the server may alternatively directly set a message display interval between two adjacent second interactive messages to a fixed interval. This is not limited in the aspects described herein.

In the foregoing aspects, the terminal device or the server determines a first display attribute of a first interactive message based on a message transmission moment of the first interactive message, where the first display attribute includes display transparency and a display interval, which increases display differentiation between first interactive messages at different message transmission moments, and improves efficiency of obtaining useful information form the first interactive message; and determines a display position of the first interactive message in the historical message dialog box according to a transmitter of the first interactive message, so that the user can distinguish between transmitters corresponding to different first interactive messages.

In addition, the terminal device or the server determines a second display attribute of the first interactive message based on a message type of the first interactive message, where the second display attribute includes a display font, a display font size, a display color, a display dynamic effect, and the like, which facilitates the user to distinguish the message type of the first interactive message according to different display effects, and further improves the efficiency of the user in obtaining useful information from the first interactive message.

In addition, based on a message response status of the first interactive message, the terminal device or the server determines a third display attribute of the first interactive message, so that a display attribute of the first interactive message can be adjusted in time according to a situation such as a position and an operation of the virtual character in the virtual battle, thereby preventing the user controlling the virtual character when the first interactive message is useless information, and improving efficiency of the user in controlling the virtual character based on the first interactive message.

In addition, in a process of receiving a message viewing operation, the terminal device can display an operation prompt and a progress bar according to an operation progress of the message viewing operation, to prompt the user of the operation progress of the current message viewing operation in time, thereby improving operation efficiency of the message viewing operation.

Further, in the aspects described herein, message prompt information is displayed only when a second interactive message exists, so that the user can identify whether the second interactive message exists based on whether the message prompt information is displayed, to determine whether to perform the message viewing operation, which helps save display costs and improves display efficiency.

Certainly, in the aspects described herein, a first duration is determined according to a battle mode of the virtual object. In other words, first durations corresponding to different battle modes are different, which helps improve flexibility and diversity of information display, and improves game experience of the user.

Figure 9:
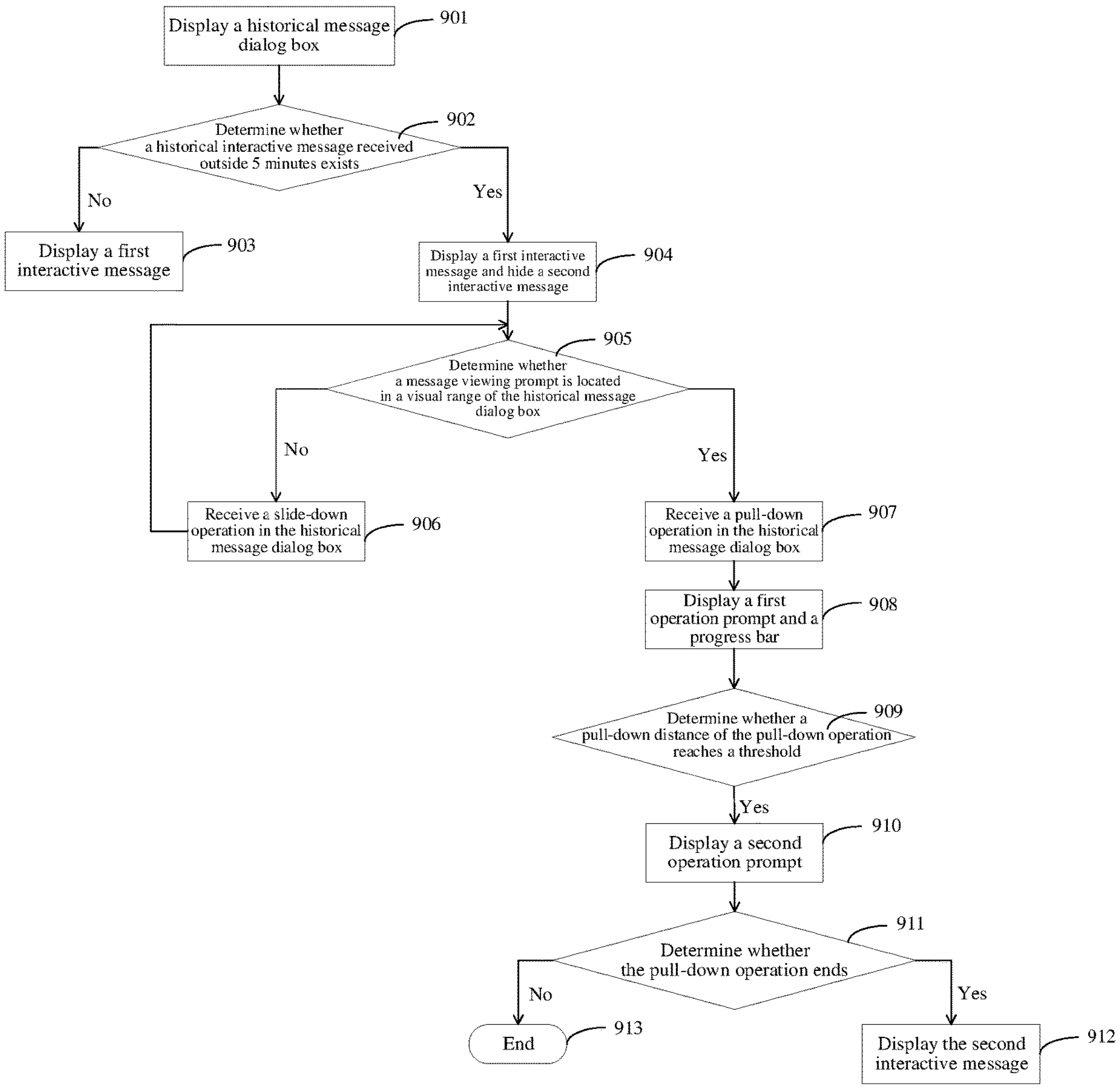
FIG. 9 is a flowchart of a method for displaying a historical message in a virtual battle according to another illustrative aspect described herein.

FIG. 9 is a flowchart of a method for displaying a historical message in a virtual battle according to an illustrative aspect described herein. Operations of the method may be executed by the foregoing terminal device, or may be executed by a client of an application program running on the foregoing terminal device.

Operation 901: Display a historical message dialog box.

Operation 902: Determine whether a historical interactive message outside 5 minutes exists.

The terminal device determines whether the historical interactive message outside 5 minutes exists. When the historical interactive message outside 5 minutes exists, Operation 904 is performed; and when the historical interactive message outside 5 minutes does not exist, Operation 903 is performed.

Operation 903: Display a first interactive message.

Operation 904: Display a first interactive message and hide a second interactive message.

Operation 905: Determine whether a message viewing prompt is located in a visual range of the historical message dialog box.

The terminal device determines whether the message viewing prompt is located in the visual range of the historical message dialog box. When the message viewing prompt is located in the visual range of the historical message dialog box, Operation 907 is performed; and when the message viewing prompt is not located in the visual range of the historical message dialog box, Operation 906 is performed.

Operation 906: Receive a slide-down operation in the historical message dialog box.

When the message viewing prompt is not located in the visual range of the historical message dialog box, the terminal device receives the slide-down operation in the historical message dialog box, and switches to display the first interactive message.

Operation 907: Receive a pull-down operation in the historical message dialog box.

When the message viewing prompt is located in the visual range of the historical message dialog box, the terminal device receives the pull-down operation in the historical message dialog box.

Operation 908: Display a first operation prompt and a progress bar.

In a process of receiving the pull-down operation, the terminal device displays the first operation prompt, to prompt a user to continue the pull-down operation, and displays the progress bar, where a display progress of the progress bar is positively correlated with an operation progress of the pull-down operation.

Operation 909: Determine whether a pull-down distance of the pull-down operation reaches a threshold.

The terminal device determines whether the pull-down distance of the pull-down operation reaches the threshold. When the pull-down distance of the pull-down operation reaches the threshold, Operation 910 is performed.

Operation 910: Display a second operation prompt.

The terminal device displays the second operation prompt, to prompt the user to end the pull-down operation.

Operation 911: Determine whether the pull-down operation ends.

The terminal device determines whether the pull-down operation ends. When the pull-down operation ends, Operation 912 is performed; and when the pull-down operation does not end, Operation 913 is performed.

Operation 912: Display a second interactive message.

When the pull-down operation ends, the terminal device displays the second interactive message in the historical message dialog box.

Operation 913. End.

Figure 10:
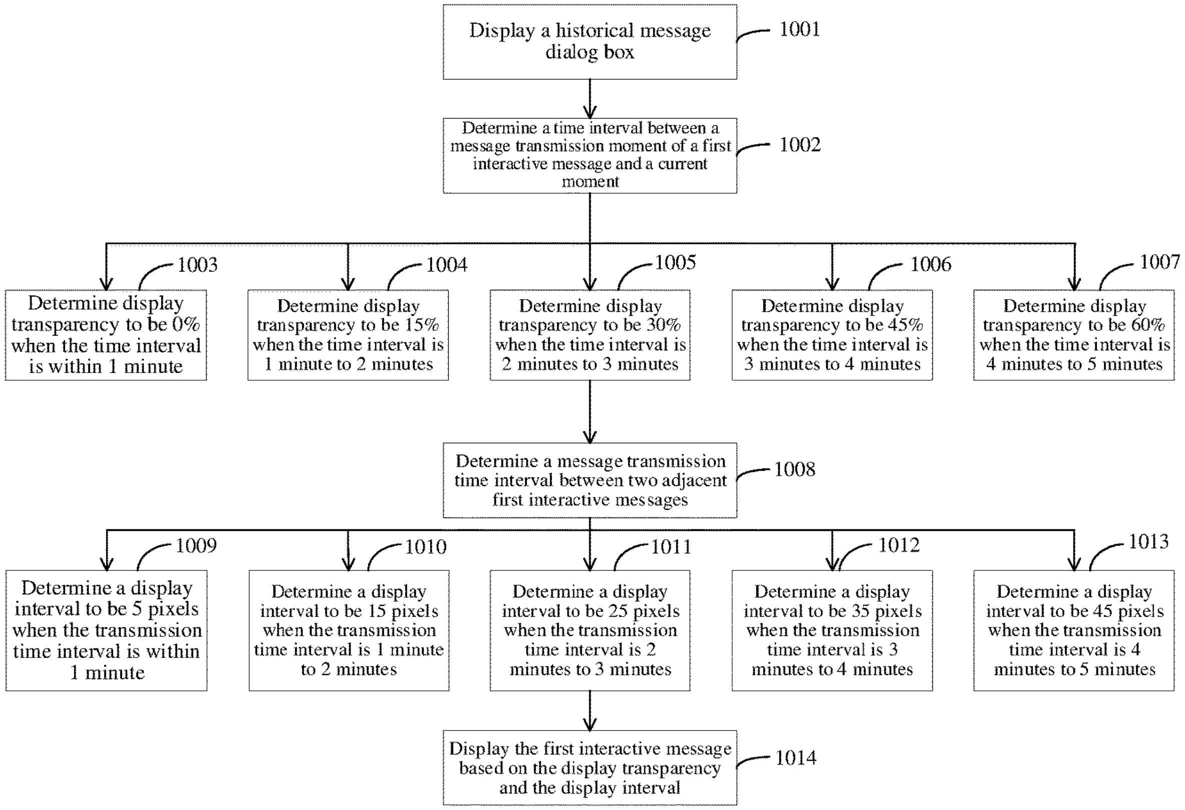
FIG. 10 is a flowchart of determining display transparency and a display interval according to an illustrative aspect described herein.

FIG. 10 is a flowchart of determining display transparency and a display interval according to an illustrative aspect described herein. Operations of the method may be executed by the foregoing terminal device, or may be executed by a client of an application program running on the foregoing terminal device.

Operation 1001: Display a historical message dialog box.

Operation 1002: Determine a time interval between a message transmission moment of a first interactive message and a current moment.

The terminal device determines the time interval between the message transmission moment of the first interactive message and the current moment based on the message transmission moment of the first interactive message, and determines display transparency of the first interactive message according to the time interval, where the display transparency is positively correlated with the time interval.

Operation 1003: Determine the display transparency to be 0% when the time interval is within 1 minute.

Operation 1004: Determine the display transparency to be 15% when the time interval is 1 minute to 2 minutes.

Operation 1005: Determine the display transparency to be 30% when the time interval is 2 minutes to 3 minutes.

Operation 1006: Determine the display transparency to be 45% when the time interval is 3 minutes to 4 minutes.

Operation 1007: Determine the display transparency to be 60% when the time interval is 4 minutes to 5 minutes.

Operation 1008: Determine a message transmission time interval between two adjacent first interactive messages.

The terminal device determines the message transmission time interval between the two adjacent first interactive messages based on the message transmission moment of each first interactive message, and determines a message display interval according to the transmission time interval, where the display interval is positively correlated with the transmission time interval.

Operation 1009: Determine the display interval to be 5 pixels when the transmission time interval is within 1 minute.

Operation 1010: Determine the display interval to be 15 pixels when the transmission time interval is 1 minute to 2 minutes.

Operation 1011: Determine the display interval to be 25 pixels when the transmission time interval is 2 minutes to 3 minutes.

Operation 1012: Determine the display interval to be 35 pixels when the transmission time interval is 3 minutes to 4 minutes.

Operation 1013: Determine the display interval to be 45 pixels when the transmission time interval is 4 minutes to 5 minutes.

Operation 1014: Display the first interactive message based on the display transparency and the display interval.

The terminal device displays the first interactive message in the historical message dialog box based on the display transparency and the display interval.

Figure 11:
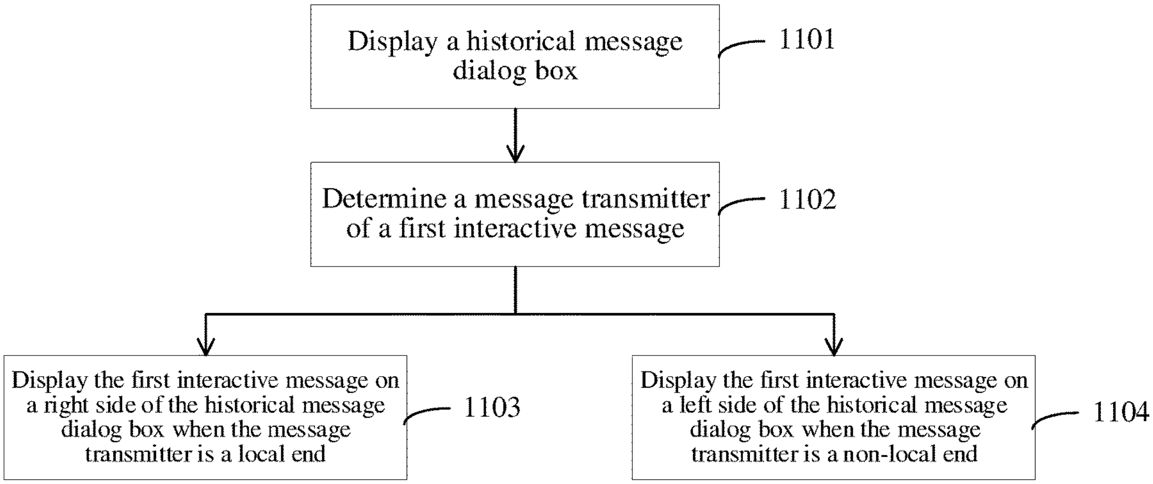
FIG. 11 is a flowchart of determining a display position according to an illustrative aspect described herein.

FIG. 11 is a flowchart of determining a display position according to an illustrative aspect described herein.

Operation 1101: Display a historical message dialog box.

Operation 1102: Determine a message transmitter of a first interactive message.

The terminal device obtains the message transmitter of the first interactive message, and determines a display position of the first interactive message based on the message transmitter.

Operation 1103: Display the first interactive message on a right side of the historical message dialog box when the message transmitter is a local end.

When the message transmitter is the local end, the terminal device displays the first interactive message in an aligned manner on the right side of the historical message dialog box.

Operation 1104: Display the first interactive message on a left side of the historical message dialog box when the message transmitter is a non-local end.

When the message transmitter is the non-local end, the terminal device displays the first interactive message in an aligned manner on the left side of the historical message dialog box.

Figure 12:
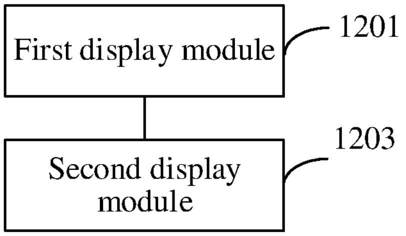
FIG. 12 is a structural block diagram of an apparatus for displaying a historical message in a virtual battle according to an illustrative aspect described herein.

FIG. 12 is a structural block diagram of an apparatus for displaying a historical message in a virtual battle according to an illustrative aspect described herein. The apparatus includes:

- a first display module 1201, configured to: display a historical message dialog box, where the historical message dialog box is configured for displaying a historical interactive message, the historical interactive message is a message transmitted by a virtual character in the virtual battle, and a first display attribute of the historical interactive message is related to a message transmission moment; and display a first interactive message and message prompt information in the historical message dialog box, where the first interactive message is a historical interactive message received within a first duration, the message prompt information is configured for prompting existence of a second interactive message, and the second interactive message is a historical interactive message received outside the first duration; and a second display module 1203, configured to display the second interactive message in the historical message dialog box when a message viewing operation on the historical message dialog box meets a message display condition, where the message display condition is a preset condition configured for triggering display of the second interactive message.

In some aspects, the first display module 1201 includes:

an obtaining unit, configured to obtain the historical interactive message and the message transmission moment;

a first display unit, configured to: when the first interactive message whose message transmission moment is within the first duration exists and the second interactive message whose message transmission moment is outside the first duration does not exist, display the first interactive message and skip displaying the message prompt information in the historical message dialog box; and a second display unit, configured to: when the first interactive message whose message transmission moment is within the first duration exists and the second interactive message whose message transmission moment is outside the first duration exists, hide the second interactive message, and generate the message prompt information before the operation of displaying a first interactive message and message prompt information in the historical message dialog box is performed.

In some aspects, the first display attribute includes display transparency; and the first display unit is configured to:

determine first display transparency corresponding to the first interactive message based on a time interval between the message transmission moment and a current moment, where the first display transparency is positively correlated with the time interval; and display the first interactive message in the historical message dialog box based on the first display transparency.

In some aspects, the second display module 1203 is configured to:

display the second interactive message with second display transparency in the historical message dialog box, where the second display transparency is minimum display transparency for displaying the historical interactive message.

In some aspects, the first display attribute includes a display interval, and the display interval represents a display distance between two adjacent historical interactive messages; and the first display unit is configured to:

determine a transmission time interval between two adjacent first interactive messages based the message transmission moment;

determine the display interval corresponding to the first interactive message based on the transmission time interval, where the display interval is positively correlated with the transmission time interval; and display the first interactive message in the historical message dialog box based on the display interval.

In some aspects, the first display unit is configured to:

obtain a message transmitter corresponding to the first interactive message; and based on the message transmitter, display a first interactive message transmitted by a local end on a first side of the historical message dialog box, and display a first interactive message transmitted by a non-local end on a second side of the historical message dialog box different from the first side.

In some aspects, the first display unit is further configured to:

determine a message type of the first interactive message, where the message type includes at least one of a location mark type, an item mark type, or a supply exchange type;

determine a second display attribute of the first interactive message based on the message type; and display the first interactive message in the historical message dialog box based on the second display attribute.

In some aspects, the first display unit is further configured to:

determine a third display attribute of the first interactive message based on a message response status of the first interactive message; and display the first interactive message in the historical message dialog box based on the third display attribute.

In some aspects, the apparatus further includes:

a status determining module, configured to: when the first interactive message is a location mark message, determine the message response status based on a position of a virtual character in the same camp within a second duration after the location mark message is transmitted; when the first interactive message is an item mark message, determine the message response status based on a pickup status of an item indicated by the item mark message; and when the first interactive message is a supply exchange message, determine the message response status based on an exchange status of a supply indicated by the supply exchange message.

In some aspects, the apparatus further includes:

a third display module, configured to display a progress bar based on the message viewing operation, where the progress bar is configured for representing an operation progress of the message viewing operation; and the second display module 1203 is further configured to display the second interactive message in the historical message dialog box when the progress bar reaches a progress threshold and the message viewing operation ends.

In some aspects, the first duration is determined based on a battle mode of a virtual object, first durations corresponding to different battle modes are different, and the first duration is related to an average duration of a battle in the battle mode.

In summary, in the aspects described herein, a historical interactive message transmitted by a virtual character in a virtual battle is displayed through a historical message dialog box, where a first display attribute of the historical interactive message is related to a message transmission moment, and when a first interactive message and message prompt information are displayed in the historical message dialog box, a message viewing operation in the historical message dialog box is received, and when the message viewing operation meets a message display condition, a second interactive message is displayed in the historical message dialog box. By using the solution provided in the aspects described herein, the first display attribute of the historical interactive message is determined according to the message transmission moment, which enriches message display forms of the historical interactive message, and the historical interactive message is divided into the first interactive message and the second interactive message according to a first duration, so that efficiency of viewing the historical interactive message is improved.

The apparatus provided in the foregoing aspects is only illustrated by taking the division of the foregoing functional modules as an example. In an actual application, the foregoing functions may be allocated to and completed by different functional modules according to requirements. In other words, an internal structure of the apparatus is divided into different functional modules, to complete all or some of the functions described above. In addition, the apparatus provided in the foregoing aspects and the method aspects belong to the same concept. For an implementation process of the apparatus, reference may be made to the method aspects. Details are not described herein again.

Figure 13:
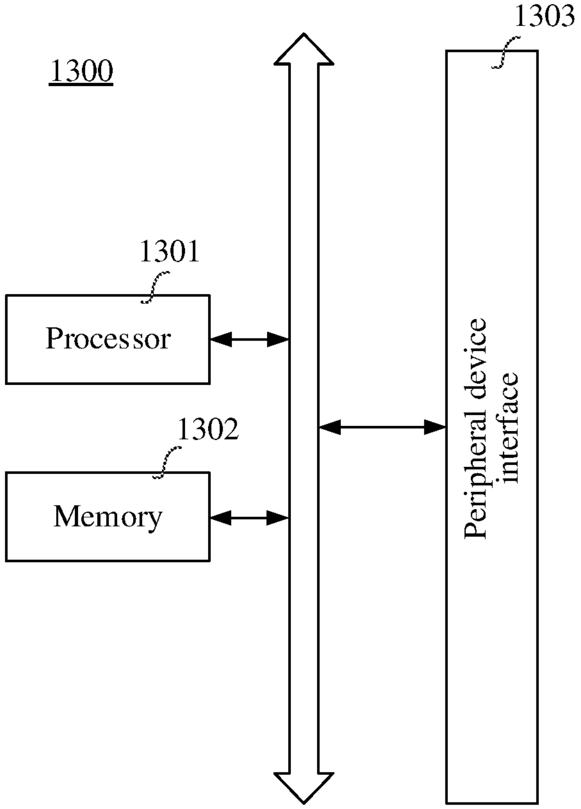
FIG. 13 is a structural block diagram of a terminal device according to an illustrative aspect described herein.

FIG. 13 shows a structural block diagram of a terminal device 1300 according to an illustrative aspect described herein. The terminal device 1300 may be a portable mobile terminal device, such as a smartphone, a tablet computer, a Moving Picture Experts Group Audio Layer III (MP3) player, or a Moving Picture Experts Group Audio Layer IV (MP4) player. The terminal device 1300 may also be referred to as another name such as user equipment or a portable terminal device.

Generally, the terminal device 1300 includes a processor 1301 and a memory 1302.

The processor 1301 may include one or more processing cores, for example, a 4-core processor or an 8-core processor. The processor 1301 may be implemented in at least one hardware form of a digital signal processor (DSP), a field-programmable gate array (FPGA), or a programmable logic array (PLA). The processor 1301 may also include a main processor and a coprocessor. The main processor is a processor configured to process data in an awake state, and is also referred to as a central processing unit (CPU). The coprocessor is a low power consumption processor configured to process data in a standby state. In some aspects, the processor 1301 may be integrated with a graphics processing unit (GPU). The GPU is configured to render and draw content that needs to be displayed on the display screen. In some aspects, the processor 1301 may further include an artificial intelligence (AI) processor. The AI processor is configured to process computing operations related to machine learning.

The memory 1302 may include one or more computer-readable storage media. The computer-readable storage medium may be tangible and non-transitory. The memory 1302 may further include a high-speed random access memory and a non-volatile memory, for example, one or more magnetic disk storage devices or flash storage devices. In some aspects, the non-transitory computer-readable storage medium in the memory 1302 is configured to store a computer program, where the computer program is configured to be executed by the processor 1301 to implement the method for displaying a historical message in a virtual battle provided in the aspects described herein.

In some aspects, the terminal device 1300 may alternatively include: a peripheral device interface 1303 and at least one peripheral device.

The peripheral device interface 1303 may be configured to connect the at least one peripheral device related to input/output (I/O) to the processor 1301 and the memory 1302. In some aspects, the processor 1301, the memory 1302 and the peripheral device interface 1303 are integrated on the same chip or circuit board. In some other aspects, any one or two of the processor 1301, the memory 1302, and the peripheral device interface 1303 may be implemented on a single chip or circuit board. This is not limited in this aspect.

A person skilled in the art may understand that the structure shown in FIG. 13 constitutes no limitation on the terminal device 1300, and the terminal device 1300 may include more or fewer components than those shown in the figure, or some components may be combined, or a different component deployment may be used.

An aspect described herein further provides a computer-readable storage medium, having at least one program stored therein, the at least one program is loaded and executed by a processor to implement the method for displaying a historical message in a virtual battle described in the foregoing aspects.

According to another aspect described herein, a computer program product is provided, where the computer program product includes a computer program, and the computer program is stored in a computer-readable storage medium. A processor of a terminal device reads the computer program from the computer-readable storage medium, and the processor executes the computer program, to cause the terminal device to perform the method for displaying a historical message in a virtual battle provided in various implementations of the foregoing aspects.

A person skilled in the art shall be aware that in the foregoing one or more examples, functions described in the aspects described herein may be implemented by hardware, software, firmware, or any combination thereof. When implemented by software, the foregoing functions may be stored in a computer-readable storage medium or transmitted as one or more computer programs in the computer-readable storage medium. The computer-readable storage medium includes a computer storage medium and a communications medium, where the communications medium includes any medium that enables a computer program to be transmitted from one place to another. The storage medium may be any available medium accessible by a general-purpose or special-purpose computer.

The foregoing descriptions are merely illustrative aspects described herein, but are not intended to limit this application. Any modification, equivalent replacement, or improvement made within the spirit and principle described herein shall fall within the protection scope described herein.

What is claimed is:

1. A method, comprising:

displaying, by a terminal device, a historical message dialog box, the historical message dialog box being configured for displaying one or more historical interactive messages during a virtual battle, each historical interactive message being a message transmitted by a virtual character in the virtual battle, wherein a first display attribute of each historical interactive message is based on a message transmission moment;

displaying one or more first interactive messages and message prompt information in the historical message dialog box, wherein each first interactive message being a historical interactive message received within a first duration, wherein the message prompt information indicates existence of one or more second interactive messages, wherein each second interactive message being a historical interactive message received outside the first duration, wherein the first display attribute comprises a display transparency, and wherein the displaying the one or more first interactive messages comprises determining first display transparency corresponding to each first interactive message based on a time interval between the message transmission moment and a current moment, and displaying each first interactive message in the historical message dialog box using the corresponding first display transparency; and displaying the one or more second interactive messages in the historical message dialog box when a message viewing operation on the historical message dialog box meets a predefined message display condition.

2. The method according to claim 1, wherein the displaying the one or more second interactive messages in the historical message dialog box comprises:

displaying each second interactive message with second display transparency in the historical message dialog box, wherein the second display transparency is a preset display transparency.

3. The method according to claim 1, wherein the first display attribute comprises a display interval representing a display distance between two adjacent historical interactive messages; and the displaying each first interactive message in the historical message dialog box comprises:

determining a transmission time interval between two adjacent first interactive messages based their respective message transmission moment;

determining the display interval corresponding to the two adjacent first interactive messages based on the transmission time interval, wherein the display interval is positively correlated with the transmission time interval; and displaying the two adjacent first interactive messages in the historical message dialog box based on the display interval.

4. The method according to any one of claim 1, wherein the displaying each first interactive message in the historical message dialog box comprises:

obtaining a message transmitter corresponding to the first interactive message; and based on the message transmitter, displaying each first interactive message transmitted by a local end on a first side of the historical message dialog box, and displaying each first interactive message transmitted by a non-local end on a second side of the historical message dialog box different from the first side.

5. The method according to claim 1, wherein the displaying each first interactive message in the historical message dialog box comprises:

determining a message type of the first interactive message, wherein the message type comprises at least one of a location mark type, an item mark type, or a supply exchange type;

determining a second display attribute of the first interactive message based on the message type; and displaying the first interactive message in the historical message dialog box based on the second display attribute.

6. The method according to claim 1, wherein the displaying each first interactive message in the historical message dialog box comprises:

determining a third display attribute of the first interactive message based on a message response status of the first interactive message; and displaying the first interactive message in the historical message dialog box based on the third display attribute.

7. The method according to claim 6, wherein the method further comprises:

when the first interactive message is a location mark message, determining the message response status based on a position of a virtual character on a same team within a second duration after the location mark message is transmitted;

when the first interactive message is an item mark message, determining the message response status based on a pickup status of an item indicated by the item mark message; and when the first interactive message is a supply exchange message, determining the message response status based on an exchange status of a supply indicated by the supply exchange message.

8. The method according to claim 1, wherein the method further comprises:

displaying a progress bar based on the message viewing operation, wherein the progress bar is configured for representing an operation progress of the message viewing operation; and the displaying the one or more second interactive messages comprises:

displaying the one or more second interactive messages in the historical message dialog box when the progress bar reaches a progress threshold.

9. The method according to claim 1, wherein the first duration is determined based on a battle mode of a virtual object, wherein each first duration corresponding to a different battle mode is unique, and the first duration is related to an average duration of a battle in the corresponding battle mode.

10. One or more non-transitory computer readable media comprising computer readable instructions which, when executed, configure a terminal device to perform:

displaying, by the terminal device, a historical message dialog box, the historical message dialog box being configured for displaying one or more historical interactive messages during a virtual battle, each historical interactive message being a message transmitted by a virtual character in the virtual battle, wherein a first display attribute of each historical interactive message is based on a message transmission moment;

displaying one or more first interactive messages and message prompt information in the historical message dialog box, wherein each first interactive message being a historical interactive message received within a first duration, wherein the message prompt information indicates existence of one or more second interactive messages, wherein each second interactive message being a historical interactive message received outside the first duration, wherein the first display attribute comprises a display transparency, and wherein the displaying the one or more first interactive messages comprises determining first display transparency corresponding to each first interactive message based on a time interval between the message transmission moment and a current moment, and displaying each first interactive message in the historical message dialog box using the corresponding first display transparency; and displaying the one or more second interactive messages in the historical message dialog box when a message viewing operation on the historical message dialog box meets a predefined message display condition.

11. The computer readable media according to claim 10, wherein the first display attribute comprises a display interval representing a display distance between two adjacent historical interactive messages; and the displaying each first interactive message in the historical message dialog box comprises:

determining a transmission time interval between two adjacent first interactive messages based their respective message transmission moment;

determining the display interval corresponding to the two adjacent first interactive messages based on the transmission time interval, wherein the display interval is positively correlated with the transmission time interval; and displaying the two adjacent first interactive messages in the historical message dialog box based on the display interval.

12. The computer readable media according to claim 10, wherein the displaying each first interactive message in the historical message dialog box comprises:

determining a message type of the first interactive message, wherein the message type comprises at least one of a location mark type, an item mark type, or a supply exchange type;

determining a second display attribute of the first interactive message based on the message type; and displaying the first interactive message in the historical message dialog box based on the second display attribute.

13. The computer readable media according to claim 10, wherein the displaying each first interactive message in the historical message dialog box comprises:

determining a third display attribute of the first interactive message based on a message response status of the first interactive message; and displaying the first interactive message in the historical message dialog box based on the third display attribute.

14. The computer readable media according to claim 13, wherein the instructions, when executed, configure the terminal device to perform:

when the first interactive message is a location mark message, determining the message response status based on a position of a virtual character on a same team within a second duration after the location mark message is transmitted;

when the first interactive message is an item mark message, determining the message response status based on a pickup status of an item indicated by the item mark message; and when the first interactive message is a supply exchange message, determining the message response status based on an exchange status of a supply indicated by the supply exchange message.

15. The computer readable media according to claim 10, wherein the first duration is determined based on a battle mode of a virtual object, wherein each first duration corresponding to a different battle mode is unique, and the first duration is related to an average duration of a battle in the corresponding battle mode.

16. A system, comprising:

a processor; and memory storing computer readable instructions which, when executed, configure the system to perform:

displaying, by the system, a historical message dialog box, the historical message dialog box being configured for displaying one or more historical interactive messages during a virtual battle, each historical interactive message being a message transmitted by a virtual character in the virtual battle, wherein a first display attribute of each historical interactive message is based on a message transmission moment;

displaying one or more first interactive messages and message prompt information in the historical message dialog box, wherein each first interactive message being a historical interactive message received within a first duration, wherein the message prompt information indicates existence of one or more second interactive messages, wherein each second interactive message being a historical interactive message received outside the first duration, wherein the first display attribute comprises a display transparency, and wherein the displaying the one or more first interactive messages comprises determining first display transparency corresponding to each first interactive message based on a time interval between the message transmission moment and a current moment, and displaying each first interactive message in the historical message dialog box using the corresponding first display transparency; and displaying the one or more second interactive messages in the historical message dialog box when a message viewing operation on the historical message dialog box meets a predefined message display condition.

17. The system according to claim 16, wherein the displaying each first interactive message in the historical message dialog box comprises:

determining a message type of the first interactive message, wherein the message type comprises at least one of a location mark type, an item mark type, or a supply exchange type;

determining a second display attribute of the first interactive message based on the message type; and displaying the first interactive message in the historical message dialog box based on the second display attribute.

18. The system according to claim 16, wherein the displaying each first interactive message in the historical message dialog box comprises:

determining a third display attribute of the first interactive message based on a message response status of the first interactive message; and displaying the first interactive message in the historical message dialog box based on the third display attribute, wherein when the first interactive message is a location mark message, determining the message response status based on a position of a virtual character on a same team within a second duration after the location mark message is transmitted, wherein when the first interactive message is an item mark message, determining the message response status based on a pickup status of an item indicated by the item mark message, and wherein when the first interactive message is a supply exchange message, determining the message response status based on an exchange status of a supply indicated by the supply exchange message.

19. The method according to claim 8, wherein the message viewing operation is a pull-down operation, and wherein a pull-down distance of the pull-down operation is positively correlated with a display progress of the progress bar.

20. The method according to claim 2, wherein the second display transparency is greater than the first display transparency of each first interactive message.

* * * * *